United States Patent
Liu et al.

(10) Patent No.: US 8,254,489 B2
(45) Date of Patent: Aug. 28, 2012

(54) TRANSMISSION METHOD AND MULTIPLE INPUT MULTIPLE OUTPUT WIRELESS COMMUNICATION SYSTEM USING THE SAME

(75) Inventors: Wen-Chung Liu, Kaohsiung (TW);
Gin-Kou Ma, Hsinchu (TW);
Muh-Rong Yang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 676 days.

(21) Appl. No.: 12/406,948

(22) Filed: Mar. 18, 2009

(65) Prior Publication Data
US 2010/0166096 A1    Jul. 1, 2010

(30) Foreign Application Priority Data
Dec. 31, 2008 (TW) ................................ 97151898 A

(51) Int. Cl.
*H04B 7/02* (2006.01)
*H04K 1/10* (2006.01)
*H04L 27/28* (2006.01)
*H03C 5/00* (2006.01)
*H03K 7/02* (2006.01)

(52) U.S. Cl. ........ 375/268; 375/260; 375/264; 375/267; 375/353

(58) Field of Classification Search .................. 375/268, 375/260, 261, 316–362, 295–362, 229–236
See application file for complete search history.

(56) References Cited

U.S. PATENT DOCUMENTS

| | | | |
|---|---|---|---|
| 6,584,159 B1* | 6/2003 | Azadet et al. | 375/285 |
| 7,356,093 B2 | 4/2008 | Liu et al. | |
| 2005/0047323 A1* | 3/2005 | Clarkson et al. | 370/203 |
| 2007/0241950 A1* | 10/2007 | Petilli et al. | 341/143 |
| 2008/0232455 A1* | 9/2008 | Abou Rjeily | 375/233 |

* cited by examiner

*Primary Examiner* — David Ometz
*Assistant Examiner* — Ross Varndell
(74) *Attorney, Agent, or Firm* — Jianq Chyun IP Office

(57) ABSTRACT

A transmission method executed in a multiple input multiple output wireless communication system may include the following steps: receiving a transmitting bit sequence; providing an X level pulse amplitude modulation (X-PAM) signal set, wherein distances between any two adjacent signal points in the X-PAM are the same; generating M signal sets according to the X-PAM signal set, wherein the $i^{th}$ signal set is formed by multiplying the X-PAM signal set with a parameter $(1/X)^{(i-1)}$, wherein i is an integer from 1 to M, and generating a X-PAM signal set joint coding/decoding table according a superposition result of the M signal sets; generating M transmitting bit sub-sequences according to the transmitting bit sequence; generating M transmitting signals according to the M transmitting bit sub-sequences and the X-PAM signal set joint coding/decoding table; transmitting the M transmitting signals to a wireless transmission channel via M transmitting antennae.

36 Claims, 6 Drawing Sheets

TABLE_1

| Transmitting bit sub-sequences | | | Modulation values of transmitting antennae | | | Signal values of receiving antennae (in case of no noise) |
|---|---|---|---|---|---|---|
| $t_1$ | $t_2$ | $t_3$ | A1 | A2 | A3 | B1=B2=B3 |
| 0 | 0 | 0 | -A | -A/2 | -A/4 | -1.75A |
| 0 | 0 | 1 | -A | -A/2 | +A/4 | -1.25A |
| 0 | 1 | 0 | -A | +A/2 | -A/4 | -0.75A |
| 0 | 1 | 1 | -A | +A/2 | +A/4 | -0.25A |
| 1 | 0 | 0 | +A | -A/2 | -A/4 | +0.25A |
| 1 | 0 | 1 | +A | -A/2 | +A/4 | +0.75A |
| 1 | 1 | 0 | +A | +A/2 | -A/4 | +1.25A |
| 1 | 1 | 1 | +A | +A/2 | +A/4 | +1.75A |

TRANSMISSION METHOD AND MULTIPLE INPUT MULTIPLE OUTPUT WIRELESS COMMUNICATION SYSTEM USING THE SAME

CROSS-REFERENCE TO RELATED APPLICATION

This application claims the priority benefit of Taiwan application serial no. 97151898, filed on Dec. 31, 2008. The entirety of the above-mentioned patent application is hereby incorporated by reference herein and made a part of specification.

BACKGROUND OF THE INVENTION

1. Field of the Invention

The present invention relates to a multiple input multiple output (MIMO) wireless communication system. More particularly, the present invention relates to a transmission method and a MIMO wireless communication system using the same.

2. Description of Related Art

A MIMO wireless communication system is a wireless communication system with multiple antennae, and the multiple antennae at a transmitting terminal of the wireless communication system can independently transmit signals, and meanwhile a receiving terminal thereof can receive and obtain original information transmitted by the transmitting terminal through the multiple antennae. Since in the MIMO wireless communication system, dada throughput and a transmitting distance of the system can be greatly increased without increasing a bandwidth or a total transmitting power loss, the MIMO wireless communication technique is popular in recent years.

A core concept of the MIMO wireless communication system is to effectively improve a spectrum efficiency of the wireless communication system based on spatial freedoms provided by a plurality of transmitting antennae and a plurality of receiving antennae, so as to improve a transmitting rate and a communication quality. Referring to FIG. 1A and FIG. 1B, FIG. 1A is a system block diagram illustrating a conventional MIMO wireless communication system, and FIG. 1B is a constellation diagram of signals within the MIMO wireless communication system of FIG. 1A. The conventional MIMO wireless communication system 10 includes a transmitting terminal TX_10 and a receiving terminal RX_10, wherein the transmitting terminal TX_10 includes a signal processing unit 101 and transmitting antennae A1-A3, and the receiving terminal RX_10 includes receiving antennae B1-B3, a signal processing unit 102, and decision units DEC_1-DEC_3.

The transmitting terminal TX_10 receives a bit sequence CData and divides the bit sequence CData into three bit sub-sequences D1, D2 and D3. The signal processing unit 101 receives the bit sub-sequences D1-D3 and respectively processes the bit sub-sequences D1-D3, and then transmits the processed results to a wireless transmission channel through the transmitting antennae A1-A3. The receiving antennae B1-B3 of the receiving terminal RX_10 receive the signals from the wireless transmission channel, and then the signal processing unit 102 processes the signals received by the receiving antennae B1-B3. Thereafter, the decision units DEC_1-DEC_3 respectively decide contents of bit sub-sequences D1'-D3' according to the processed signals C1-C3. Finally, the receiving terminal RX_10 can assemble the bit sub-sequences D1'-D3' into a bit sequence CData'.

Generally, if a channel impulse response of the wireless transmission channel can be correctly pre-estimated, and in case that the channels are mutually independent, and if a noise influence thereof is not great, the bit sequence CData' is equivalent to the bit sequence CData, theoretically. In this example, the signal processing unit 101 can modulate the bit sub-sequences D1-D3, and a modulation method thereof is quadrature phase shift keying (QPSK). The constellation diagram of the signals transmitted by the transmitting antennae A1-A3 is as that shown in FIG. 1B. The signals received by the receiving antennae B1-B3 are combinations of the signals transmitted by the antennae A1-A3, and in the wireless transmission channel, the noises are inevitably superposed to the transmitted signals, so that dots on the constellation diagram (FIG. 1B) of the signals received by the receiving antennae B1-B3 may have a scattered distribution. Therefore, the signal processing unit 102 has to be applied to process the signals received by the receiving antennae B1-B3, so as to generate the signals C1-C3. In case of an ideal circumstance, a dot distribution of the constellation diagram (FIG. 1B) of the signals C1-C3 is the same as that of the signals transmitted by the transmitting antennae A1-A3.

SUMMARY OF THE INVENTION

The exemplary embodiment of the present invention provides a transmission method adapted to a MIMO wireless communication system. A transmitting terminal of the MIMO wireless communication system has M transmitting antennae, and a receiving terminal of the MIMO wireless communication system has N receiving antennae, wherein M and N are any integers greater than 0. The transmission method includes at least following steps. A transmitting bit sequence is received. An X level pulse amplitude modulation (X-PAM) signal set is provided, wherein distances between any two adjacent signal points in the X-PAM signal set are the same. A first to an $M^{th}$ signal sets are generated according to the X-PAM signal set, wherein the $i^{th}$ signal set is formed by multiplying the X-PAM signal set with a parameter $(1/X)^{(i-1)}$, wherein i is an integer between 1 to M. A X-PAM signal set joint coding/decoding table is generated according a superposition result of the first to the $M^{th}$ signal sets. A first to an $M^{th}$ transmitting bit sub-sequences are generated according to the transmitting bit sequence. A first to an $M^{th}$ transmitting signals are generated according to the first to the $M^{th}$ transmitting bit sub-sequences and the X-PAM signal set joint coding/decoding table. And, the first to the $M^{th}$ transmitting signals are transmitted to a wireless transmission channel via the first to the $M^{th}$ transmitting antennae.

Moreover, the exemplary embodiment of the present invention provides a MIMO wireless communication system, which can execute the aforementioned transmission method.

The exemplary embodiment of the present invention provides another transmission method adapted to a MIMO wireless communication system. A transmitting terminal of the MIMO wireless communication system has M transmitting antennae, and a receiving terminal of the MIMO wireless communication system has N receiving antennae, wherein M and N are any integers greater than 0. The transmission method includes following steps. A total bit number of amplitude resolutions of M digital-to-analog converters (DAC) of the transmitting terminal of the MIMO wireless communication system is calculated. A total bit number of amplitude resolutions of N analog-to-digital converters (ADC) of the receiving terminal of the MIMO wireless communication system is calculated. And, an ultimate transmitting rate of the MIMO wireless communication system is determined according to the total bit number of the amplitude resolutions of the M DACs and the total bit number of the amplitude resolutions of the N ADCs.

Moreover, the exemplary embodiment of the present invention provides a MIMO wireless communication system, which can execute the aforementioned transmission method.

According to the above description, the transmission method and the MIMO wireless communication system provided by the exemplary embodiment of the present invention can provide a variable bit transmitting rate without changing a signal constellation diagram thereof, and a communication transmission structure can be flexibly selected. Moreover, in the transmission method and the MIMO wireless communication system provided by the exemplary embodiment of the present invention, an arrangement of each of the antennae is not limited to be a specific geometric shape or to have a specific relative position, and each of the antennae has an independent ADC and a DAC, wherein the ADC and the DAC are not limited to have the same amplitude resolutions.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate several exemplary embodiments of the invention and, together with the description, serve to explain the principles of the invention.

FIG. 2C is a diagram of a 2-PAM signal set joint coding/decoding table according to an exemplary embodiment of the present invention.

DESCRIPTION OF EMBODIMENTS

Figure 1A:
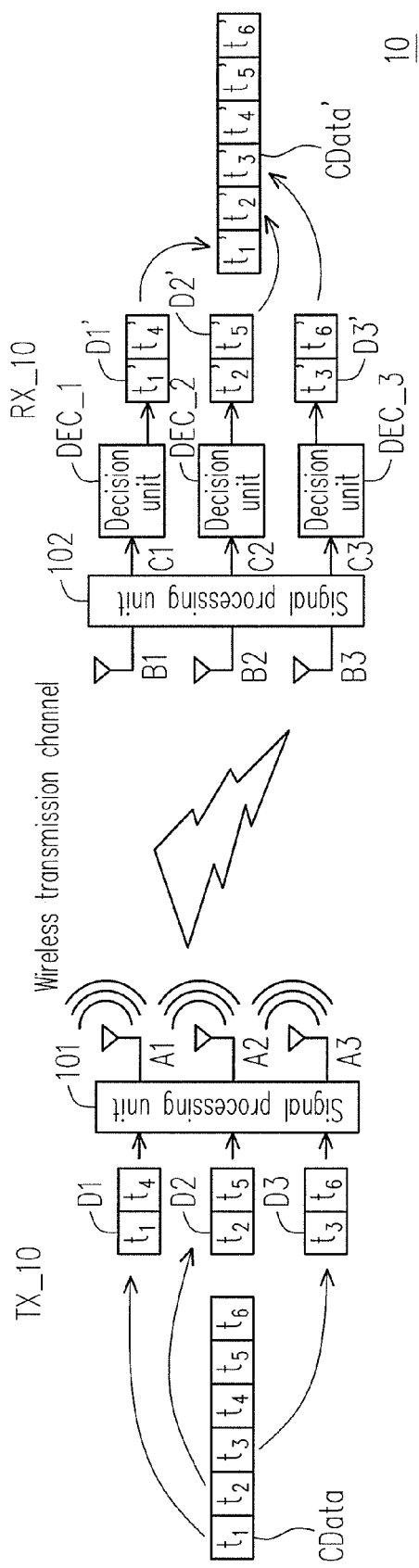
FIG. 1A is a block diagram illustrating a conventional MIMO wireless communication system.
Figure 1B:
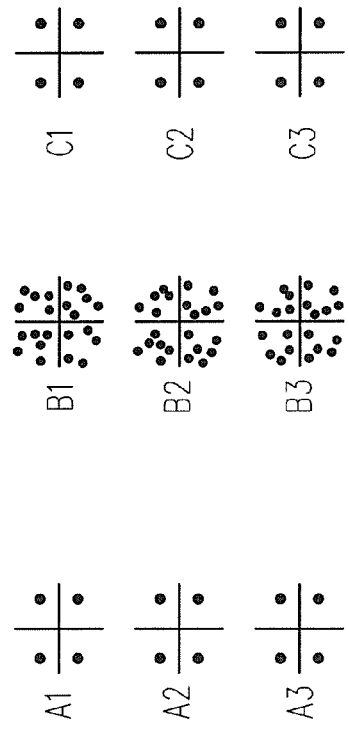
FIG. 1B is a constellation diagram of signals within the MIMO wireless communication system of FIG. 1A.
Figure 2A:
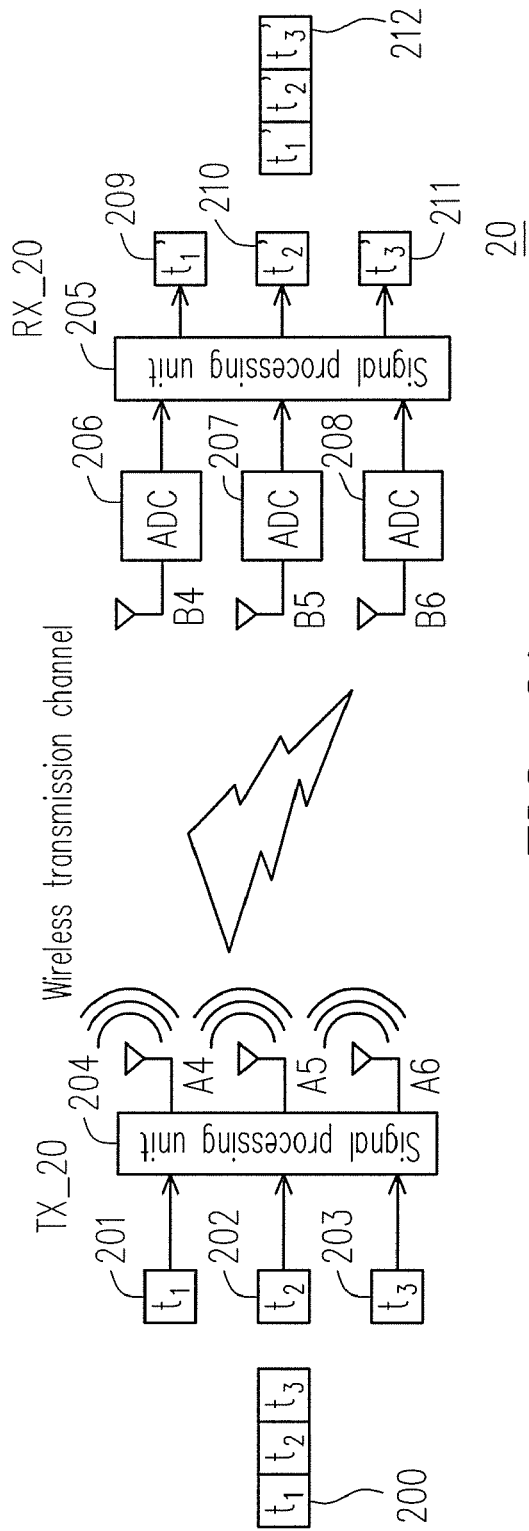
FIG. 2A is a block diagram illustrating a MIMO wireless communication system according to an exemplary embodiment of the present invention.
Figure 2B:
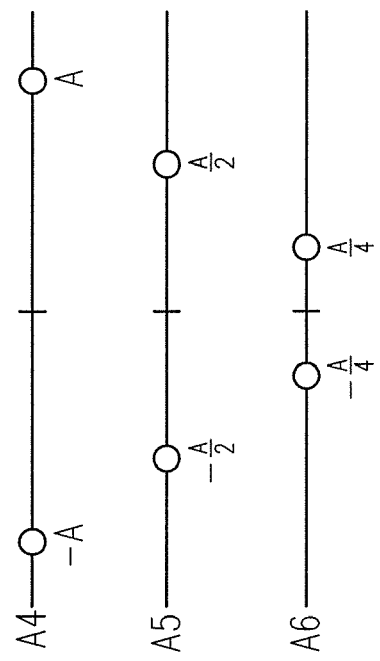
FIG. 2B is a constellation diagram of signals within the MIMO wireless communication system of FIG. 2A.

A plurality of exemplary embodiments is provided below to describe MIMO wireless communication systems and transmission methods provided by the present invention. For simplicity's sake, only structures of the MIMO wireless communication systems are described, though descriptions of the structures of the MIMO wireless communication system are all integrated with the transmission methods thereof. Thus, the transmission methods can be disclosed and taught by the following descriptions, First, referring to FIG. 2A and FIG. 2B, FIG. 2A is a block diagram illustrating a MIMO wireless communication system according to an exemplary embodiment of the present invention, and FIG. 2B is a constellation diagram of signals within the MIMO wireless communication system of FIG. 2A. The MIMO wireless communication system 20 includes a transmitting terminal TX_20 and a receiving terminal RX_20, wherein the transmitting terminal TX_20 includes a signal processing unit 204 and transmitting antennae A4-A6, and the receiving terminals RX_20 includes receiving antennae B4-B6, a signal processing unit 205, and analog-to-digital converters (ADC) 206-208.

The transmitting terminal TX_20 receives an original bit sequence 200, and divides the original bit sequence 200 into three original bit sub-sequences 201-203. The signal processing unit 204 includes more than one DACs and an X-PAM signal set joint coding table. The signal processing unit 204 receives the original bit sub-sequences 201-203, and respectively converts and encodes the original bit sub-sequences 201-203 to generate three transmitting signals. Then, the transmitting signals are transmitted to a wireless transmission channel through the transmitting antennae A4-A6. The receiving antennae B4-B6 of the receiving terminal RX_20 receive the receiving signals from the wireless transmission channel. Then, the ADCs 206-208 respectively convert the three receiving signals received by the receiving antennae B4-B6 into three digital signals. Thereafter, the signal processing unit 205 processes the digital signals to generate a receiving bit sequence 212.

The signal processing unit 204 generates a plurality of signal sets according to the X-PAM signal set. In the present exemplary embodiment, a first to a third signal sets are generated. It should be noted that distances between any two adjacent signal points in the X-PAM signal set are the same. Generally, X is a power series of 2, i.e. $X=2^y$, and y is a positive integer. Moreover, the first signal set is equivalent to the X-PAM signal set, the second signal set is formed by multiplying the X-PAM signal set with a parameter (1/X), and the third signal set is formed by multiplying the X-PAM signal set with a parameter $(1/X)^2$. According to such principle, an X-PAM signal set joint coding/decoding table is generated.

Referring to FIG. 2C, FIG. 2C is a diagram of a 2-PAM signal set joint coding/decoding table according to an exemplary embodiment of the present invention. Referring to FIGS. 2A-2C, FIG. 2B is a signal constellation diagram when the 2-PAM signal set is applied. The transmitting terminal applies the 2-PAM signal set joint coding/decoding table TABLE_1 to code the original bit sequence 200. Now, a bit transmitting rate of the system is 3 bits/unit time.

The signal processing unit 204 generates the transmitting signals corresponding to the transmitting antennae A4-A6 according to the 2-PAM signal set joint coding/decoding table TABLE_1. For example, if the three original bit sub-sequence 201-203 is 000, the transmitting signal corresponding to the transmitting antenna A4 is −A, the transmitting signal corresponding to the transmitting antenna A5 is −A/2, and the transmitting signal corresponding to the transmitting antenna A6 is −A/4. Wherein, A represents a regularization parameter, and the regularization parameter A averages a total transmitting power of the transmitting terminal to a fixed value.

The ADC 206 of the receiving terminal RX_20 converts an analog voltage value into a digital value, and according to a well known communication principle, such analog voltage value is a superposition of the above three transmitting signals. The ADCs 206-208 independently perform the conversions, and independently transmit the converted digital values to the signal processing unit 205. The signal processing unit 205 performs channel equalizations on the values of the three digital signals according to channel information (including a channel frequency response or a channel impulse response) of the wireless transmission channel, and decodes the values of the three digital signals according to the same 2-PAM signal set joint coding/decoding table TABLE_1. Since the values of the three digital signals represent three independent observation versions of the transmitting signals, the receiving bit sequence 212 can be obtained through a soft decision, wherein the receiving bit sequence is an estimation value of the transmitting bit sequence 200.

In the exemplary embodiment of FIG. 2A and FIG. 2B, amplitude resolutions of the ADCs 206-208 of the receiving terminal RX_20 are all assumed to be 1 bit, and the amplitude resolutions of the DACs in the signal processing unit 204 of the transmitting terminal TX_20 are also assumed to be 1 bit. Therefore, bit numbers transmitted and received by the transmitting terminal TX_20 and the receiving terminal RX_20 per unit time are the same. In other words, a bit receiving rate of the receiving terminal RX_20 is the same as a bit transmitting rate of the transmitting terminal TX_20. Moreover, in the exemplary embodiment of FIG. 2A and FIG. 2B, the X-PAM signal set is assumed to be the 2-PAM signal set, though the present invention is not limited to the MIMO wireless communication system applying the 2-PAM signal set.

Moreover, it should be noted that though the MIMO wireless communication system 20 having three transmitting antennae and three receiving antennae is taken as an example, however, the present invention is not limited thereto, and any MIMO wireless communication system having M transmitting antennae and N receiving antennae can be implemented according to the aforementioned design. If the MIMO wireless communication system has M transmitting antennae, an $i^{th}$ transmitting signal transmitted by the $i^{th}$ transmitting antenna is one of the signals in an $i^{th}$ signal set, and the $i^{th}$ signal set is equivalent to a signal set formed by multiplying the X-PAM signal set with a parameter $(1/X)^{(i-1)}$, wherein i is an integer between 1 to M, and M and N can be any integers greater than 0.

A number of transmitting antennae of a conventional MIMO wireless communication system has to be less than or equal to a number of receiving antennae thereof, though the MIMO wireless communication system provided by the exemplary embodiment of the present invention is not limited thereto. In other words, N can be less than M. Moreover, regarding the MIMO wireless communication system having M transmitting antennae and one receiving antenna. In order to successfully obtain the original bit sequence, the amplitude resolution of the ADC of the receiving terminal is $2^{M \log_2(X)}$ bits. Now, each level of the ADC of the receiving terminal maps to the original bit sequence of the transmitting terminal one-to-one.

An ultimate transmitting rate (maximum transmitting rate) of the aforementioned MIMO wireless communication system is determined according to a total amplitude resolution of the DACs of the transmitting terminal TX_20 and a total amplitude resolution of the ADCs of the receiving terminal RX_20, namely, a minimum value thereof is taken as the ultimate transmitting rate of the MIMO wireless communication system. If an ideal channel capacity or an estimated channel capacity of the wireless transmission channel is known or estimated, the ultimate transmitting rate of the MIMO wireless communication system is then determined according to a minimum value among the total amplitude resolution of the DACs of the transmitting terminal TX_20, the total amplitude resolution of the ADCs of the receiving terminal RX_20, and the ideal or estimated channel capacity. In brief, the bit receiving rate of the receiving terminal and the bit transmitting rate of the transmitting terminal can be adjusted by the MIMO wireless communication system according to the determined ultimate transmitting rate, so as to equalize the bit receiving rate of the receiving terminal and the bit transmitting rate of the transmitting terminal.

Figure 3A:
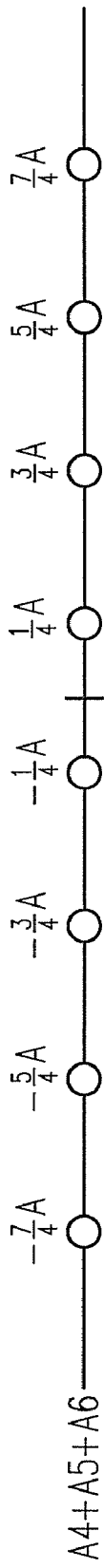
FIG. 3A is a constellation diagram of a signal set formed by superposing three transmitting signals of a MIMO wireless communication system of FIG. 2A.

Next, referring to FIG. 3A, FIG. 3A is a constellation diagram of a signal set formed by superposing three transmitting signals of the MIMO wireless communication system of FIG. 2A. When the MIMO wireless communication system 20 applies the 2-PAM signal set, the signal set formed by superposing the three transmitting signals is {−7A/4, −5A/4, . . . , 5A/4, 7A/4}. Here, the first, the third, the fifth, and the seventh points counted from the right side are defined as odd signal points, and the other points are defined as even signal points. When the MIMO wireless communication system 20 reduces the bit transmitting rate, for example, from 3 bits/unit time to 2 bits/unit time, the transmitting terminal performs a joint coding operation on the received original bit sequence, and generates three transmitting signals to the transmitting antennae A4-A6. Now, as long as the odd signal points or the even signal points on the constellation diagram of the three superposed signals of FIG. 3A are removed, and the first to the third transmitting signals are selected for the transmitting antennae A4-A6 according to two original bit sub-sequences, the MIMO wireless communication system with variable bit transmitting rate can be implemented.

Figure 3B:
FIG. 3B is a constellation diagram of a signal set formed by superposing three transmitting signals of a MIMO wireless communication system of FIG. 2A when a bit transmitting rate thereof is reduced by one bit/unit time.

Referring to FIG. 3B, FIG. 3B is a constellation diagram of a signal set formed by superposing three transmitting signals of the MIMO wireless communication system of FIG. 2A with a bit transmitting rate of 2 bits/unit time. As shown in FIG. 3B, when the bit transmitting rate of the transmitting terminal TX_20 is reduced by one bit per unit time, the superposed signal set of FIG. 3B formed by removing the even signal points on the constellation diagram of FIG. 3A is applied. Now, the joint coding is performed on the original bit sequence to generate three transmitting signals, wherein a signal formed by superposing the three transmitting signals can be one of −7A/4, −3A/4, 1A/4 and 5A/4. Comparatively, the receiving terminal RX_20 can perform the decoding by applying a corresponding decoding table, so as to obtain an estimation of the original bit sequence.

Figure 3C:
FIG. 3C is a constellation diagram of a signal set formed by superposing three transmitting signals of a MIMO wireless communication system of FIG. 2A when a bit transmitting rate thereof is reduced by two bits/unit time.

Referring to FIG. 3C, FIG. 3C is a constellation diagram of a signal set formed by superposing three transmitting signals of the MIMO wireless communication system of FIG. 2A with a bit transmitting rate of 1 bit/unit time. As shown in FIG. 3C, when the bit transmitting rate of the transmitting terminal TX_20 is reduced by two bits per unit time, the superposed signal set formed by removing the even signal points on the constellation diagram of FIG. 3B is applied. Now, the joint coding is performed on the original bit sequence to generate three transmitting signals, wherein a signal formed by superposing the three transmitting signals can be one of −7A/4, and A/4. Comparatively, the receiving terminal RX_20 can perform the decoding by applying a corresponding decoding table, so as to obtain an estimation of the original bit sequence.

Though in the aforementioned exemplary embodiment, the MIMO wireless communication system with variable bit transmitting rate is implemented through the superposed signal set formed by removing the even signal points, the MIMO wireless communication system with variable bit transmitting rate can also be implemented through the superposed signal set formed by removing the odd signal points. In brief, removing of the odd signal points or the even signal points is not limited by the present invention. Therefore, regarding a MIMO wireless communication system designed according to the spirit of the present invention, if it has M transmitting antennae, and the X-PAM signal set is applied, the transmitting terminal thereof can transmit M*$\log_2(X)$ to 1 bit per unit time.

Figure 4A:
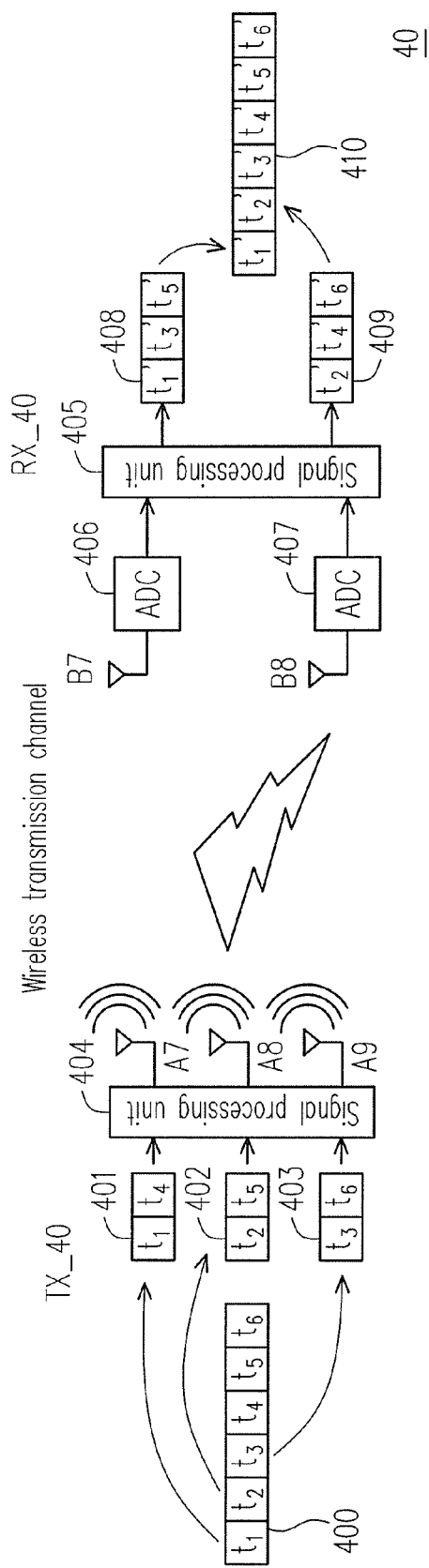
FIG. 4A is a system block diagram illustrating another MIMO wireless communication system according to an exemplary embodiment of the present invention.

Next, referring to FIG. 4A, FIG. 4A is a system block diagram illustrating another MIMO wireless communication system according to an exemplary embodiment of the present invention. The MIMO wireless communication system 40 includes a transmitting terminal TX_40 and a receiving terminal RX_40, wherein the transmitting terminal TX_40 includes a signal processing unit 404 and transmitting antennae A7-A9, and the receiving terminal includes receiving antennae B7 and B8, a signal processing unit 405 and ADCs 406 and 407. In the present exemplary embodiment, an original bit sequence 400 is divided into three original bit sub-sequences 401-403 by the transmitting terminal TX_40, and the receiving terminal RX_40 can assemble receiving bit sub-sequences 408 and 409 into a receiving bit sequence 410. In the signal processing 404 of the present exemplary embodiment, the amplitude resolution of the DAC corresponding to each of the original bit sub-sequences 401-403 is 2 bits, and a total amplitude resolution of the ADCs 406 and 407 of the receiving terminal RX_40 is 6 bits. Regarding the receiving terminal RX_40 and the transmitting terminal TX_60, a minimum total amplitude resolution thereof is 6 bits. Therefore, the bit transmitting rate of the MIMO wireless communication system is 6 bits/unit time.

Figure 4B:
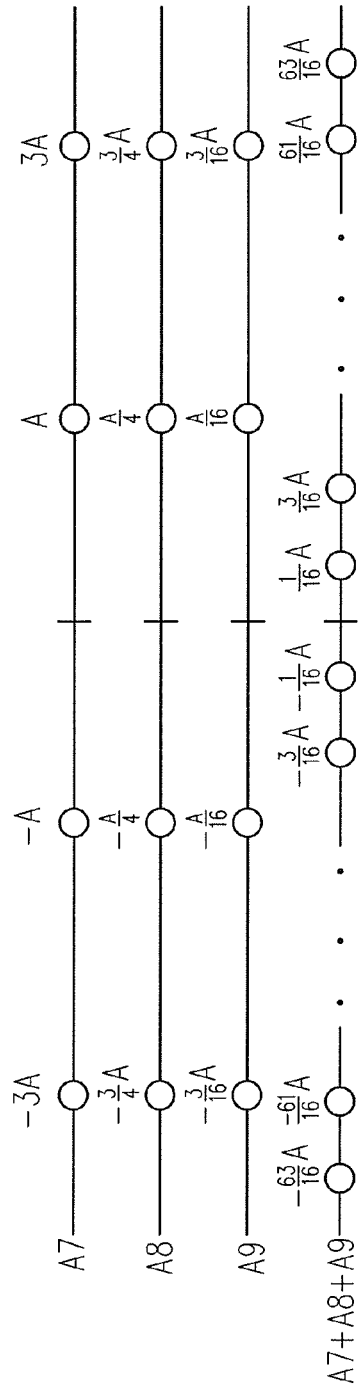
FIG. 4B is a constellation diagram of signals within a MIMO wireless communication system of FIG. 4A.

Next, referring to FIG. 4B, FIG. 4B is a constellation diagram of signals within the MIMO wireless communication system of FIG. 4A. In the signal processing unit 404 of the present exemplary embodiment, the amplitude resolution of the DAC corresponding to each of the original bit sub-sequences 401-403 is 2 bits, and the amplitude resolution of each of the ADCs 406 and 407 of the receiving terminal RX_40 is 3 bits. Moreover, the transmitting terminal TX_40 applies a 4-PAM signal set. The first signals set is equivalent to the 4-PAM signal set {−3A, −A, A, 3A}, the second signal set is {−3A/4, −A/4, A/4, 3A/4}, which is formed by multiplying the 4-PAM signal set with a parameter (1/4), and the third signal set is {−3A/16, −A/16, A/16, 3A/16}, which is formed by multiplying the 4-PAM signal set with a parameter $(1/4)^2$.

The signal processing unit 404 can generate a 4-PAM signal set joint coding/decoding table according to the aforementioned principle. Then, the transmitting signals corresponding to the transmitting antennae A7-A9 are generated according to the 4-PAM signal set joint coding/decoding table.

Moreover, a constellation diagram of the superposed signal set formed by superposing the three transmitting signals is illustrated in FIG. 4B, and the superposed signal set formed by superposing the three transmitting signals is {−63A/16, −61A/16, ... , 61A/16, 63A/16}. If the MIMO wireless communication system 40 reduces the bit transmitting rate by one bit per unit time, the aforementioned method can be referred to performing the joint coding on the transmitting bit sub-sequences 401-403, and the signal set formed by superposing the three transmitting signals is equivalent to a signal set formed by removing the odd signal points or the even signal points from the original superposed signal set.

In addition, according to the aforementioned exemplary embodiments, the MIMO wireless communication system of the present exemplary embodiment can have M transmitting antennae and N receiving antennae, wherein M and N are any integers greater than 0, and N is unnecessary to be greater or equal to M. Besides, in the transmission method and the MIMO wireless communication system provided by the present exemplary embodiment of the present invention, an arrangement of each of the antennae is not limited to be a specific geometric shape or to have a specific relative position, and each of the antennae has an independent ADC and a DAC, wherein the ADC and the DAC are not limited to have the same resolutions. Therefore, according to the design concept of the MIMO wireless communication system of the present exemplary embodiment, the receiving terminal thereof can apply more intensive antennae to collect more energy of the transmitting signals.

Figure 5:
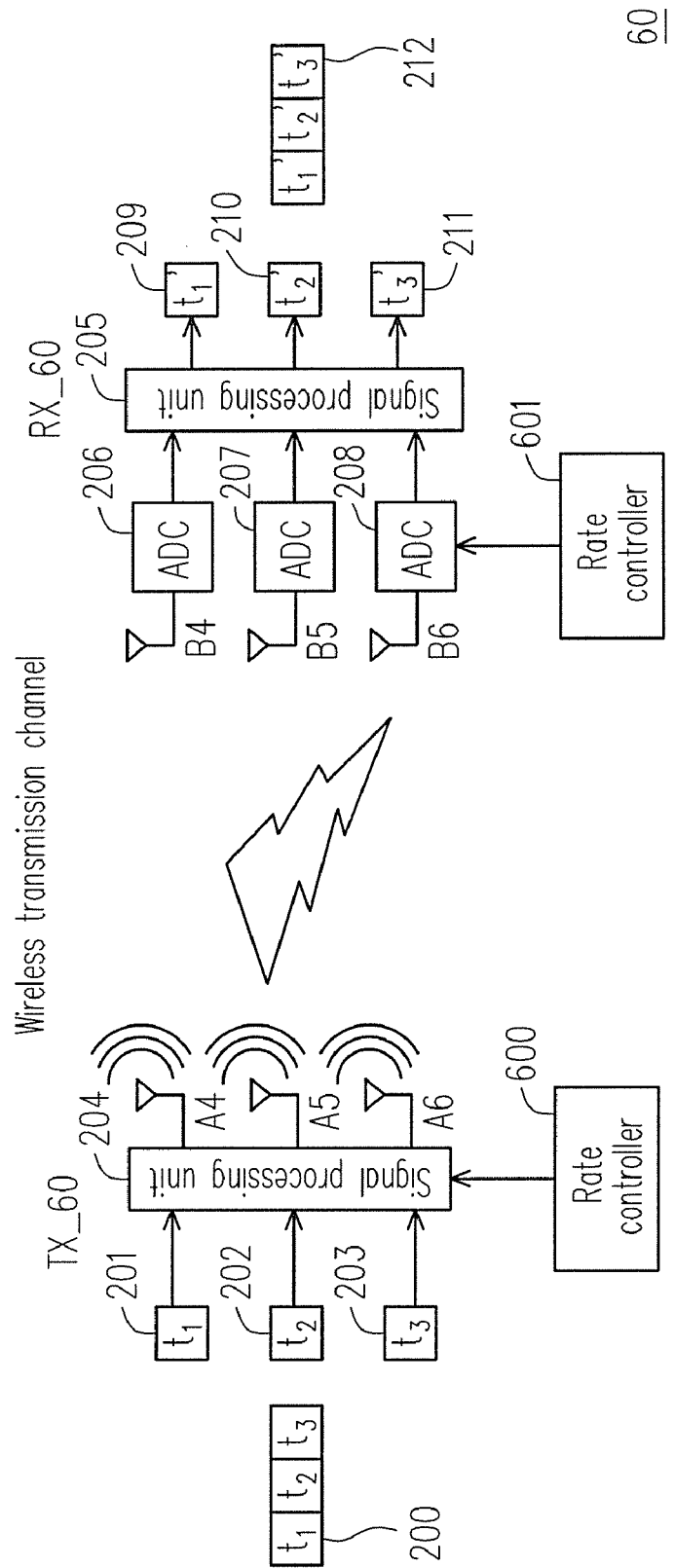
FIG. 5 is a system block diagram illustrating another MIMO wireless communication system according to an exemplary embodiment of the present invention.

Next, referring to FIG. 5, FIG. 5 is a system block diagram illustrating another MIMO wireless communication system according to an exemplary embodiment of the present invention. As described above, the ultimate transmitting rate (the maximum transmitting rate) of the MIMO wireless communication system is determined according to a total amplitude resolution of DACs of a transmitting terminal TX_60, a total amplitude resolution of ADCs of a receiving terminal RX_60, and a channel capacity of the wireless transmission channel. In the present exemplary embodiment, the MIMO wireless communication system 60 has discrete rate controllers 600 and 601. Though in the present exemplary embodiment, the ultimate transmitting rate is determined by the discrete rate controllers 600 and 601, the present invention is not limited thereto. In other words, a centralized controller can also be applied to simultaneously control the transmitting terminal and the receiving terminal, so as to determine the ultimate transmitting rate. The discrete rate controllers 600 and 601 can be communicated through a reliable wireless control channel, so as to determine the bit transmitting rates of the transmitting terminal TX_60 and the receiving terminal RX_60. The discrete rate controller 600 can determine the X-PAM signal set to be used by the transmitting terminal TX_60 and the receiving terminal RX_60 according to the ultimate transmitting rate. In other words, the discrete rate controller 600 can determine a minimum value of X. Moreover, the discrete rate controllers 600 and 601 can respectively control a joint coding manner of the transmitting terminal TX_60 and a joint decoding method of the receiving terminal RX_60.

After the ultimate transmitting rate is determined, the discrete rate controller 600 controls the signal processing unit 204 to select a minimum X-PAM that can achieve the ultimate transmitting rate, so as to improve a transmission accuracy of the communication system. Moreover, if the channel information of the wireless transmission channel is already obtained, a water filling method can be applied to estimate a transmitting power distribution of each of the transmitting antennae, so as to achieve a relatively great Euclidean geometry distance between code words of each of the transmitting signals. In other words, the transmitting signals to be transmitted by the transmitting antennae are determined according to the transmitting power distribution of the transmitting antennae and a total power of the transmitting signals. In addition, to increase a transmission reliability, an error correction coding can be performed on the original bit sequence at the transmitting terminal, and then a corresponding error correction decoding can be performed on the receiving bit sequence at the receiving terminal to obtain the original bit sequence.

In summary, the MIMO wireless communication systems and the methods thereof provided by the exemplary embodiments of the present invention can fully utilize various possible combinations to achieve a high-rate transmission, and the number of the transmitting antenna or the receiving antenna can be any integer greater than 0. Moreover, since the total bit numbers of the amplitude resolutions of the physically achievable transmitting terminal and receiving terminal are limited, the MIMO wireless communication system and the transmission method thereof determines the ultimate transmitting rate according to the total bit number of the amplitude resolutions of the transmitting terminal and the receiving terminal. Moreover, the transmitting antennae and the receiving antennae of the MIMO communication system provided by the exemplary embodiment of the present invention can be arbitrarily arranged.

It will be apparent to those skilled in the art that various modifications and variations can be made to the structure of the exemplary embodiments the present invention without departing from the scope or spirit of the present invention. In view of the foregoing, it is intended that the present invention cover modifications and variations of the exemplary embodiments of the present invention provided they fall within the scope of the following claims and their equivalents.

What is claimed is:

1. A transmission method, adapted to a multiple input multiple output (MIMO) wireless communication system, a transmitting terminal of the MIMO wireless communication system having M transmitting antennae, and a receiving terminal of the MIMO wireless communication system having N receiving antennae, wherein M is an integer greater than 1 and N is an integer greater than or equal to 1, and the transmission method comprising:

receiving, at the transmitting terminal, a transmitting bit sequence;

providing, at the transmitting terminal, an X level pulse amplitude modulation (X-PAM) signal set, wherein distances between any two adjacent signal points in the X-PAM signal set are the same;

generating, at the transmitting terminal, M different types of signal sets represented as a first to an $M^{th}$ signal sets according to the X-PAM signal set, wherein the $i^{th}$ signal set is formed by multiplying the X-PAM signal set with a parameter $(1/X)^{(i-1)}$, wherein i is an integer between 2 to M, and generating, at the transmitting terminal, an X-PAM signal set joint coding/decoding table according a superposition result of the first to the $M^{th}$ signal sets;

generating, at the transmitting terminal, a first to an $M^{th}$ transmitting bit sub-sequences according to the transmitting bit sequence;

generating, at the transmitting terminal, a first to an $M^{th}$ transmitting signals according to the first to the $M^{th}$ transmitting bit sub-sequences and the X-PAM signal set joint coding/decoding table; and transmitting, at the transmitting terminal, the first to the $M^{th}$ transmitting signals to a wireless transmission channel via the first to the $M^{th}$ transmitting antennae, wherein the $i^{th}$ transmitting signal transmitted by the $i^{th}$ transmitting antenna is one of the signals in the $i^{th}$ signal set.

2. The transmission method as claimed in claim 1, wherein the X-PAM signal set joint coding/decoding table comprises a signal set formed by superposing the first to the $M^{th}$ signal sets, or a signal set formed by superposing the first to the $M^{th}$ signal sets while removing odd signal points or even signal points thereof for at least once.

3. The transmission method as claimed in claim 1 further comprising:

determining, at the transmitting terminal, a minimum value of X of the X-PAM signal set according to an ultimate transmitting rate of the MIMO wireless communication system; and performing, at the transmitting terminal, a joint coding on the transmitting bit sequence according to the ultimate transmitting rate of the MIMO wireless communication system, so as to generate the first to the $M^{th}$ transmitting bit sub-sequences.

4. The transmission method as claimed in claim 1, wherein X is a power series of 2.

5. The transmission method as claimed in claim 1, wherein an arrangement of the first to the $M^{th}$ transmitting antennae and an arrangement of the first to the $N^{th}$ receiving antennae are not limited to be a specific geometric shape or to have a specific relative position.

6. The transmission method as claimed in claim 1, further comprising:

applying, at the receiving terminal, the first to the $N^{th}$ receiving antennae to receive a first to an $N^{th}$ receiving signals from the wireless transmission channel;

performing, at the receiving terminal, analog-to-digital conversions on the first to the $N^{th}$ receiving signals to generate a first to an $N^{th}$ digital signals;

generating, at the receiving terminal, a first to an $N^{th}$ receiving bit sub-sequences according to the first to the $N^{th}$ digital signals and the X-PAM signal set joint coding/decoding table; and assembling, at the receiving terminal, the first to the $N^{th}$ receiving bit sub-sequences to generate a receiving bit sequence.

7. The transmission method as claimed in claim 6, wherein if N=1, a bit number of an amplitude resolution of an analog-to-digital converter (ADC) of the receiving terminal of the MIMO wireless communication system is $2^{M\log_2(x)}$.

8. The transmission method as claimed in claim 6, wherein a bit number of an amplitude resolution of the ADC of the receiving terminal of the MIMO wireless communication system is not limited to be the same as a bit number of an amplitude resolution of a digital-to-analog converter (DAC) of the transmitting terminal of the MIMO wireless communication system.

9. The transmission method as claimed in claim 1, further comprising:

estimating, at the transmitting terminal, a transmitting power distribution of the first to the $M^{th}$ transmitting antennae; and determining, at the transmitting terminal, the transmitting signals to be transmitted by the first to the $M^{th}$ transmitting antennae according to the transmitting power distribution of the first to the $M^{th}$ transmitting antennae and a total power of the first to the $M^{th}$ transmitting signals.

10. A transmission method, adapted to a MIMO wireless communication system, a transmitting terminal of the MIMO wireless communication system having M transmitting antennae, and a receiving terminal of the MIMO wireless communication system having N receiving antennae, wherein M is an integer greater than 1 and N is an integer greater than or equal to 1, and the transmission method comprising:

calculating, at the transmitting terminal, a total bit number of amplitude resolutions of M DACs of the transmitting terminal of the MIMO wireless communication system;

calculating, at the receiving terminal, a total bit number of amplitude resolutions of N ADCs of the receiving terminal of the MIMO wireless communication system; and determining, at the MIMO wireless communication system, an ultimate transmitting rate of the MIMO wireless communication system according to the total bit number of the amplitude resolutions of the M DACs and the total bit number of the amplitude resolutions of the N ADCs, wherein the ultimate transmitting rate represents a maximum transmitting rate of the MIMO wireless communication system;

determining, at the transmitting terminal, an X value according to the ultimate transmitting rate, and providing an X-PAM signal set;

generating, at the transmitting terminal, M different types of signal sets according to the X-PAM signal set, wherein the $i^{th}$ signal set is formed by multiplying the X-PAM signal set with $(1/X)^{(i-1)}$, wherein i is an integer between 2 to M, and, at the transmitting terminal, generating an X-PAM signal set joint coding/decoding table according a superposition result of the M signal sets;

generating, at the transmitting terminal, M transmitting bit sub-sequences according to the transmitting bit sequence;

generating, at the transmitting terminal, M transmitting signals according to the first to the $M^{th}$ transmitting bit sub-sequences and the X-PAM signal set joint coding/decoding table; and transmitting, at the transmitting terminal, the M transmitting signals to a wireless transmission channel via the M transmitting antennae, wherein the $i^{th}$ transmitting signal transmitted by the $i^{th}$ transmitting antenna is one of the signals in the $i^{th}$ signal set.

11. The transmission method as claimed in claim 10, further comprising:

estimating, at the MIMO wireless communication system, a channel capacity of a wireless transmission channel; and determining, at the MIMO wireless communication system, the ultimate transmitting rate according to the total bit number of the amplitude resolutions of the M DACs, the total bit number of the amplitude resolutions of the N ADCs, and the channel capacity.

12. The transmission method as claimed in claim 10, wherein the X-PAM signal set joint coding/decoding table comprises a signal set formed by superposing the M signal sets, or a signal set formed by superposing the M signal sets while removing odd signal points or even signal points thereof for at least once.

13. The transmission method as claimed in claim 10, wherein X is a power series of 2.

14. The transmission method as claimed in claim 10, wherein an arrangement of the M transmitting antennae and an arrangement of the N receiving antennae are not limited to be a specific geometric shape or to have a specific relative position.

15. The transmission method as claimed in claim 10, further comprising:

applying, at the receiving terminal, the N receiving antennae to receive N receiving signals from the wireless transmission channel;

performing, at the receiving terminal, analog-to-digital conversions on the N receiving signals to generate N digital signals;

generating, at the receiving terminal, N receiving bit sub-sequences according to the N digital signals and the X-PAM signal set joint coding/decoding table; and assembling, at the receiving terminal, the N receiving bit sub-sequences to generate a receiving bit sequence.

16. The transmission method as claimed in claim 15, wherein if N=1, a bit number of an amplitude resolution of an ADC of the receiving terminal of the MIMO wireless communication system is $2^{M \log_2(x)}$.

17. The transmission method as claimed in claim 15, wherein a bit number of an amplitude resolution of the ADC is not limited to be the same as a bit number of an amplitude resolution of the DAC.

18. The transmission method as claimed in claim 10, further comprising:

estimating, at the transmitting terminal, a transmitting power distribution of the M transmitting antennae; and determining, at the transmitting terminal, the transmitting signals to be transmitted by the M transmitting antennae according to the transmitting power distribution of the M transmitting antennae and a total power of the M transmitting signals.

19. A MIMO wireless communication system, comprising:

a transmitting terminal, comprising M transmitting antennae; and a receiving terminal, comprising N receiving antennae, wherein the transmitting terminal receives a transmitting bit sequence, and provides an X-PAM signal set, wherein distances between any two adjacent signal points in the X-PAM signal set are the same, the transmitting terminal generates a first to an $M^{th}$ signal sets according to the X-PAM signal set, wherein the $i^{th}$ signal set is formed by multiplying the X-PAM signal set with a parameter $(1/X)^{(i-1)}$, and i is an integer between 2 to M, the transmitting terminal generates a X-PAM signal set joint coding/decoding table according a superposition result of the first to the $M^{th}$ signal sets, the transmitting terminal generates a first to an $M^{th}$ transmitting bit sub-sequences according to the transmitting bit sequence, the transmitting terminal generates a first to an $M^{th}$ transmitting signals according to the first to the $M^{th}$ transmitting bit sub-sequences and the X-PAM signal set joint coding/decoding table, and the transmitting terminal transmits the first to the $M^{th}$ transmitting signals to a wireless transmission channel through the first to the $M^{th}$ transmitting antennae, wherein the $i^{th}$ transmitting signal transmitted by the $i^{th}$ transmitting antenna is one of the signals in the $i^{th}$ signal set.

20. The MIMO wireless communication system as claimed in claim 19, wherein the X-PAM signal set joint coding/decoding table comprises a signal set formed by superposing the first to the $M^{th}$ signal sets, or a signal set formed by superposing the first to the $M^{th}$ signal sets while removing odd signal points or even signal points thereof for at least once.

21. The MIMO wireless communication system as claimed in claim 19, wherein an ultimate transmitting rate of the MIMO wireless communication system determines a minimum value of X of the X-PAM signal set, and a joint coding is performed on the transmitting bit sequence according to the ultimate transmitting rate of the MIMO wireless communication system, so as to generate the first to the $M^{th}$ transmitting bit sub-sequences.

22. The MIMO wireless communication system as claimed in claim 19, wherein X is a power series of 2.

23. The MIMO wireless communication system as claimed in claim 19, wherein an arrangement of the first to the $M^{th}$ transmitting antennae and an arrangement of the first to the $N^{th}$ receiving antennae are not limited to be a specific geometric shape or to have a specific relative position.

24. The MIMO wireless communication system as claimed in claim 19, wherein the receiving terminal applies the first to the $N^{th}$ receiving antennae to receive a first to an $N^{th}$ receiving signals from the wireless transmission channel, the receiving terminal performs analog-to-digital conversions on the first to the $N^{th}$ receiving signals to generate a first to an $N^{th}$ digital signals, the receiving terminal generates a first to an $N^{th}$ receiving bit sub-sequences according to the first to the $N^{th}$ digital signals and the X-PAM signal set joint coding/decoding table, and the receiving terminal assembles the first to the $N^{th}$ receiving bit sub-sequences to generate a receiving bit sequence.

25. The MIMO wireless communication system as claimed in claim 24, wherein if N=1, a bit number of an amplitude resolution of an ADC of the receiving terminal of the MIMO wireless communication system is $2^{M\log_2(x)}$.

26. The MIMO wireless communication system as claimed in claim 24, wherein the receiving terminal comprises N ADCs, and the transmitting terminal comprises M DACs, and a bit number of an amplitude resolutions of the N ADCs is not limited to be the same as a bit number of amplitude resolutions of the M DACs.

27. The MIMO wireless communication system as claimed in claim 19, wherein the transmitting terminal further estimates an optimal transmitting power distribution of the first to the $M^{th}$ transmitting antennae, and the transmitting terminal determines the transmitting signals to be transmitted by the first to the $M^{th}$ transmitting antennae according to the optimal transmitting power distribution of the first to the $M^{th}$ transmitting antennae and a total power of the first to the $M^{th}$ transmitting signals.

28. A MIMO wireless communication system, comprising: a transmitting terminal, comprising M transmitting antennae and M DACs; and a receiving terminal, comprising N receiving antennae and N ADCs, wherein the transmitting terminal calculates a total bit number of amplitude resolutions of the M DACs, the receiving terminal calculates a total bit number of amplitude resolutions of the N ADCs, and the MIMO wireless communication system determines an ultimate transmitting rate of the MIMO wireless communication system according to the total bit number of the amplitude resolutions of the M DACs and the total bit number of the amplitude resolutions of the N ADCs, wherein the ultimate transmitting rate represents a maximum transmitting rate of the MIMO wireless communication system;

wherein the transmitting terminal further determines an X value according to the ultimate transmitting rate, and the transmitting terminal generates M different types of signal sets according to an X-PAM signal set, wherein the $i^{th}$ signal set is formed by multiplying the X-PAM signal set with $(1/X)^{(i-1)}$, and i is an integer between 2 to M, the transmitting terminal generates a X-PAM signal set joint coding/decoding table according a superposition result of M signal sets, the transmitting terminal generates M transmitting bit sub-sequences according to a transmitting bit sequence, the transmitting terminal generates M transmitting signals according to the first to the $M^{th}$ transmitting bit sub-sequences and the X-PAM signal set joint coding/decoding table, and the transmitting terminal transmits the M transmitting signals to a wireless transmission channel through the M transmitting antennae, wherein the $i^{th}$ transmitting signal transmitted by the $i^{th}$ transmitting antenna is one of the signals in the $i^{th}$ signal set.

29. The MIMO wireless communication system as claimed in claim 28, wherein the MIMO wireless communication system further estimates a channel capacity of a wireless transmission channel, and determines the ultimate transmitting rate according to the total bit number of the amplitude resolutions of the M DACs, the total bit number of the amplitude resolutions of the N ADCs, and the channel capacity.

30. The MIMO wireless communication system as claimed in claim 28, wherein the X-PAM signal set joint coding/decoding table comprises a signal set formed by superposing the M signal sets, or a signal set formed by superposing the M signal sets while removing odd signal points or even signal points thereof for at least once.

31. The MIMO wireless communication system as claimed in claim 28, wherein X is a power series of 2.

32. The MIMO wireless communication system as claimed in claim 28, wherein an arrangement of the M transmitting antennae and an arrangement of the N receiving antennae are not limited to be a specific geometric shapes or to have a specific relative position.

33. The MIMO wireless communication system as claimed in claim 28, wherein the receiving terminal applies the N receiving antennae to receive N receiving signals from the wireless transmission channel, the receiving terminal performs analog-to-digital conversions on the N receiving signals to generate N digital signals, the receiving terminal generates N receiving bit sub-sequences according to the N digital signals and the X-PAM signal set joint coding/decoding table, and assembles the N receiving bit sub-sequences to generate a receiving bit sequence.

34. The MIMO wireless communication system as claimed in claim 33, wherein if N=1, a bit number of an amplitude resolution of the ADC of the receiving terminal of the MIMO wireless communication system is $2^{M\log_2(x)}$.

35. The MIMO wireless communication system as claimed in claim 33, wherein a bit number of an amplitude resolution of the ADC is not limited to be the same as a bit number of an amplitude resolution of the M DAC.

36. The MIMO wireless communication system as claimed in claim 28, wherein the transmitting terminal estimates a transmitting power distribution of the M transmitting antennae, and determines the transmitting signals to be transmitted by the M transmitting antennae according to the transmitting power distribution of the M transmitting antennae and a total power of the M transmitting signals.

* * * * *